United States Patent [19]

Zellner et al.

[11] 3,764,581

[45] Oct. 9, 1973

[54] PROCESS FOR THE PREPARATION OF POLYESTEROXIMES AND POLYBENZOXAZOLE (PBO) TYPE POLYMERS DERIVED THEREFROM

[75] Inventors: Carl N. Zellner, New Hope, Pa.; Henry W. Steinmann, Sparta, N.J.

[73] Assignee: Celanese Corporation, New York, N.Y.

[22] Filed: Oct. 30, 1970

[21] Appl. No.: 85,753

[52] U.S. Cl............... 260/47 R, 260/2 R, 260/2 S, 260/30.2, 260/30.6 R, 260/30.8 DS, 260/31.2 N, 260/32.4, 260/32.6 N, 260/328 N, 260/33.2 R, 260/49, 260/79.3 R, 260/448.2 B, 260/448.2 N, 260/453, 260/456 A, 260/448 CD, 260/566 D, 260/823, 260/824 R

[51] Int. Cl............................................. C08g 33/02

[58] Field of Search.................... 260/47 R, 49, 79, 260/2 R, 2 S, 79.3 R

[56] References Cited
UNITED STATES PATENTS
3,268,545   8/1966   Litt et al............................. 260/307
3,306,876   2/1967   Kantor et al......................... 260/47
3,560,438   2/1971   Burton et al......................... 260/47

Primary Examiner—William H. Short
Assistant Examiner—L. L. Lee
Attorney—Thomas J. Morgan, C. B. Barris and K. E. Macklin

[57] ABSTRACT

Process for the preparation of polymers which comprises reacting at temperatures of from about 0° to about 250°C an aromatic diol or its alkali metal or Group IIa or IIb metal di-salt with a bis(hydroxamoyl halide) or a derivative thereof to form a polyesteroxime, which may then be subjected to ring closing conditions to form polybenzoxazole (PBO) type polymers. Formation of the polyesteroxime is preferably conducted in the presence of a solvent, which may or may not also function as an acid-acceptor; if not, then preferably also in the presence of an acid-acceptor. The preferred acid-acceptors are those which are insoluble in the reaction mixture—most preferably melamine. The ring closure may be conducted in the presence of a catalyst at temperatures of from about 0° to about 250°C or by reaction with a sulfonyl halide at temperatures of from about 0° to about 90°C. Reactive hydroxy or hydroxamoyl halide terminal groups of the polyesteroximes, or PBO type polymers, may be reacted with other compounds or polymers which contain groups reactive therewith in order to further extend the polymer chains. In a preferred prior step, aromatic bis(hydroxamoyl halide) reactants are made by the reaction of dialkyl aromatic precursors, e.g., any of the isomers of xylene, with, e.g., nitrosyl halide. Novel polyesteroximes.

21 Claims, No Drawings

PROCESS FOR THE PREPARATION OF POLYESTEROXIMES AND POLYBENZOXAZOLE (PBO) TYPE POLYMERS DERIVED THEREFROM

This invention relates to a novel process for the preparation of polyesteroximes and to polybenzoxazole (PBO) type polymers produced therefrom.

Polyesteroximes are useful as chelating agents for sequestering polyvalent metal ions in plating baths, polluted streams, etc. The polymers are also useful as catalyst carriers and as ion-exchange resins. The polymers may be formed into fibers, films, molded articles, etc. Instead of undergoing ring closure to form the PBO type polymers of this invention, the polyesteroximes may be hydrolyzed to high performance polyesters by reaction with, e.g., dilute hydrochloric acid, or their oxime groups may be hydrogenated under appropriate conditions to amine groups to form polyamines, which are also useful as chelating agents. The polyamines may be reacted with polyepoxides to form epoxy resins and moded articles, or they may be cross-linked with dicarboxylic acids to form polyamide resins of interesting and varied properties.

The PBO polymers of this invention generally are useful for applications where high performance polymers are required. For example, in aerospace applications where retention of strength at elevated temperatures and flame retardancy are required, the PBO polymers of this invention are outstanding. Heretofore, Nomex polyamide type resins have been used in coveralls, etc. worn by pilots and race car drivers to protect against injuries from fires resulting from crashes, etc. Unfortunately, Nomex garments are not as nonflammable as desired. In addition, wearers of these garments have complained that they are clammy, especially when worn in a closed cockpit. PBO type polymers are much less flammable than Nomex resins. Garments made from PBO type polymers are not clammy, especially when the fabric in the garment is woven from staple, which fabric has the feel of cotton.

Heretofore, PBO type polymers have been made by the reaction of an aromatic dihydroxy diamino compound with a dicarboxylic acid or a derivative thereof. Over-all this process is undersirable because it is expensive and also because of toxicity problems. The dihydroxy diamino compound is difficult to synthesize and difficult to purify, thereby resulting in a very expensive starting material. The other starting material is usually isophthaloyl chloride. PBO type polymers produced by the process of the prior art have been limited in applicability because of the tan color of the polymer. The PBO polymers of the present invention are white or nearly white. In any event, they are much lighter in color than the PBO type polymers of the prior art and may be dyed to almost any desired color.

One or more of the foregoing and other adverse effects of the prior art process are overcome by the novel process of the present invention.

Generally, the process of the present invention comprises reacting an aromatic dihydroxy compound with a bis (hydroxamoyl halide) or a derivative thereof to form the polyesteroxime, which may then be subjected to ring closing conditions to form the PBO type polymers of this invention.

Illustrative of the aromatic dihydroxy compounds or their alkali metal or Group IIa or IIb metal di-salts which may be used in the present invention are those which may be depicted by the following general formula:

MO—Y—OM wherein M is hydrogen, or an alkali metal or Group IIa or IIb metal; Y is , wherein R is as defined below, and the like. Y may be substituted with groups which do not detrimentally interfere with the reaction.

Illustrative subcategories of the hydroxy compounds which may be used are:

I. Compounds of the general formula

MO—Z—OM wherein M is as described above and wherein Z is 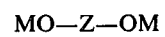;

II. Compounds of the general formula

MO—C$_6$H$_4$—C$_6$H$_4$—OM wherein M is as described above; and

III. Compounds of the general formula

MO—C$_6$H$_4$—R—C$_6$H$_4$—OM wherein M is as described above and R may be

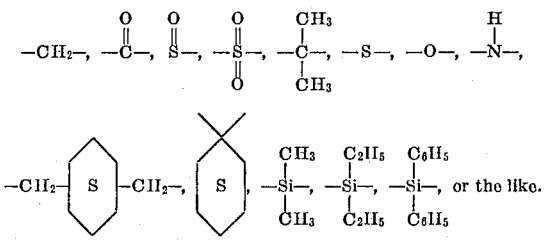

In each of the above formulas, it is preferred that M be M', M' being an alkali metal or a Group IIa or IIb metal. Preferred alkali metals are lithium, sodium and potassium. Preferred Group IIa and IIb metals are magnesium, strontium, barium, calcium and zinc. Sodium is most preferred as M', and sodium bisphenol A is the most preferred salt.

Illustrative or particular aromatic dihydroxy compounds which may be used in the process of this invention are the following:

1,2-dihydroxy benzene
1,3-dihydroxy benzene
1,4-dihydroxy benzene
1,4-dihydroxy naphthalene
1,5-dihydroxy naphthalene
1,6-dihydroxy naphthalene
1,7-dihydroxy naphthalene
1,8-dihydroxy naphthalene
2,3-dihydroxy naphthalene
2,6-dihydroxy naphthalene
2,7-dihydroxy naphthalene
1,4-dihydroxy-2-methyl-naphthalene
1,4-dihydroxy-anthracene
2,6-dihydroxy-anthracene
9,10-dihydroxy-anthracene 9,10-dihydroxy phenanthrene
2,2'-dihydroxy-biphenyl
2,4'-dihydroxy-biphenyl
3,3'-dihydroxy-biphenyl
3,4'-dihydroxy-biphenyl
4,4'-dihydroxy-biphenyl
4,4'-dihydroxy-2,2'-dimethyl-biphenyl
1,1-bis(4-hydroxyphenyl) cyclohexane
bis(4-hydroxyphenyl) dimethyl silane
bis(4-hydroxyphenyl) diethyl silane
bis(4-hydroxyphenyl)diphenyl silane
bis(4-hydroxyphenyl) amine
bis(4-hydroxyphenyl)ether,i.e., 4,4'-dihydroxy diphenyl ether
bis(4-hydroxyphenyl) thioether
2,2-bis(4-hydroxyphenyl) propane
bis(4-hydroxyphenyl) sulfone
bis(4-aminophenyl) sulfoxide
bis(4-hydroxyphenyl) ketone
bis(4-hydroxyphenyl) methane It is preferable to use the diols in the form of their di-salts, rather than than the diols *per se*. Illustrative of the di-salts are the following:

disodium salt of 1,2-dihydroxy benzene
dipotassium salt of 1,3-dihydroxy benzene
disodium salt of 1,4-dihydroxy benzene
dipotassium salt of 1,4-dihydroxy naphthalene
disodium salt of 1,5-dihydroxy naphthalene
dipotassium salt of 1,6-dihydroxy naphthalene
disodium salt of 1,7-dihydroxy naphthalene
dipotassium salt of 1,8-dihydroxy naphthalene
disodium salt of 2,3-dihydroxy naphthalene
dipotassium salt of 2,6-dihydroxy naphthalene
disodium salt of 1,4-dihydroxy-2-methyl-naphthalene
dipotassium salt of 1,4-dihydroxy-anthracene
disodium salt of 2,6-dihydroxy-anthracene
dipotassium salt of 9,10-dihydroxy-anthracene
disodium salt of 9,10-dihydroxy phenanthrene
dipotassium salt of 2,2'-dihydroxy-biphenyl
disodium salt of 2,4'-dihydroxy-biphenyl
dipotassium salt of 3,3'-dihydroxy-biphenyl
disodium salt of 3,4'-dihydroxy-biphenyl
dipotassium salt of 4,4'-dihydroxy-biphenyl
disodium salt of 4,4'-dihydroxy-2,2'-dimethyl-biphenyl
dipotassium salt of 1,1-bis(4-hydroxy phenyl) cyclohexane
disodium salt of bis(4-hydroxy phenyl)dimethyl silane
dipotassium salt of bis(4-hydroxy phenyl) diethyl silane
disodium salt of bis(4-hydroxy phenyl) diphenyl silane
dipotassium salt of bis(4-hydroxy phenyl) amine
disodium salt of bis(4-hydroxy phenyl) ether,
dipotassium salt of bis(4-hydroxy pheynl) thioether
disodium salt of 2,2-bis(4-hydroxy phenyl) propane
dipotassium salt of bis(4-hydroxy phenyl) sulfone
disodium salt of bis(4-hydroxy phenyl) sulfoxide
dipotassium salt of bis(4-hydroxy phenyl) ketone
disodium salt of bis(4-hydroxy phenyl) methane By the term "aromatic dihydroxy compound" is meant a compound in which the two hydroxy groups are each attached to an aromatic ring, not necessarily both attached to the same ring, however. Generally, any aromatic diol containing up to about 30 carbon atoms can be used in the present invention. Preferably the diol contains up to about 20 carbon atoms, most preferably up to about 15 carbon atoms. The most preferred diol is bis-phenol A.

Although the diol per se may be used in the reaction it is highly desirable to use the diol in the form of its alkali metal salt, especially its lithium, sodium or potassium salt. The sodium and potassium salts are preferred.

The alkali metal salts may be formed by reacting, e.g., the alkali metal hydroxide with the aromatic diol in aqueous solution or suspension. It is preferred that the di-salt so formed be dried before use. The isolation and drying may be accomplished in any convenient and effective method which occurs to one skilled in the art. For example, the salt may be precipitated from solution by addition of an alcohol to the reaction mixture, the precipitate may be washed with ether and then dried in an oven. Alternatively, the reaction mixture may be dried to a slurry and then the remaining water azeotropically distilled with cyclohexanone or any other solvent with which water forms a useful azeotrope. These solvents are readily ascertained from available published tables of azeotropes.

Bis(hydroxamoyl halides) which may be used in this invention may be either aliphatic or aromatic and may be, e.g., the chlorides, bromides, or iodides. The chlorides and bromides are generally preferred. Derivatives of those compounds, e.g., the O-sulfonates, may be used instead. The compounds are illustrated by the following formula:

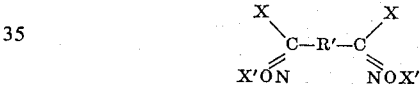

wherein X is halogen or-OR'',-SR''(R'' is alkyl of up to four carbon atoms) or —OC$_6$H$_5$; R' is a direct bond or a divalent aliphatic, aromatic or organosilicon group; and X' is hydrogen or an —SO$_2$OK, —SO$_2$ONa,

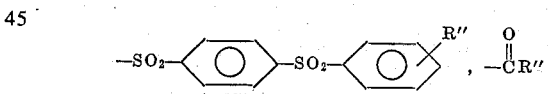

(R'' is alkyl of up to four carbon atoms),

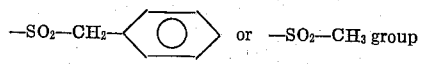

Illustrative of the aliphatic groups represented by R' are —CH$_2$—, —C$_2$H$_4$—, —C$_3$H$_6$—, —C$_4$H$_8$—, and the like. Illustrative of the organo-silicon groups are

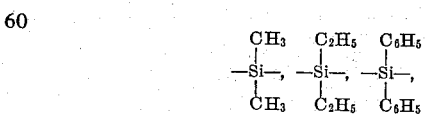

and the like. Illustrative of the aromatic groups represented by R' are —C$_6$H$_4$—, —C$_6$H$_4$.C$_6$H$_4$—, —C$_{10}$H$_6$—, —C$_{14}$H$_8$—, (—C$_6$H$_4$—)$_2$ R''', wherein R''' is

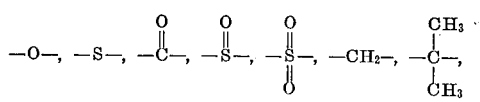

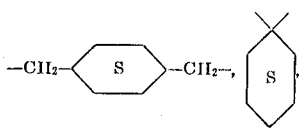

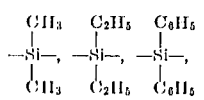

and the like. It is preferred that R' be an aliphatic or aromatic divalent group. It is further preferred that R' contain up to about 18 carbon atoms if R' is aromatic and up to about four carbon atoms if R' is aliphatic. If R' is a divalent organosilicon group it is preferred that it contain up to about 12 carbon atoms, most preferably up to four carbon atoms. R' is most preferably —$C_6H_4$—.

Illustrative of particular bis (hydroxamoyl halides) are the following:

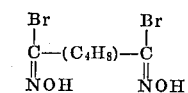

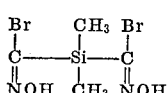

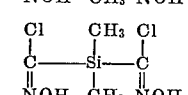

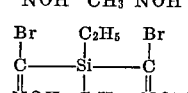

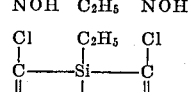

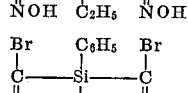

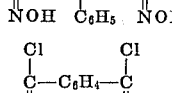

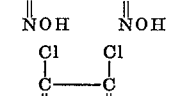

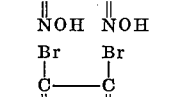

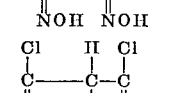

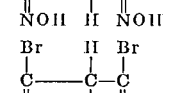

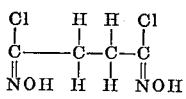

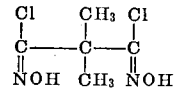

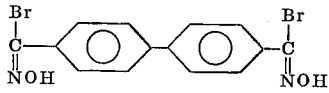

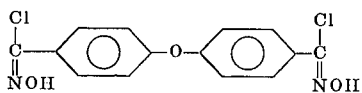

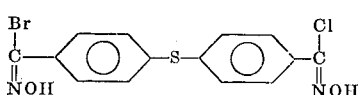

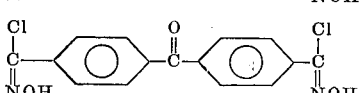

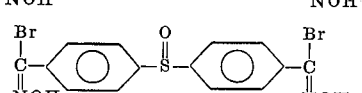

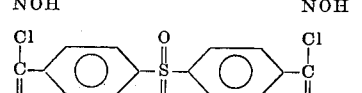

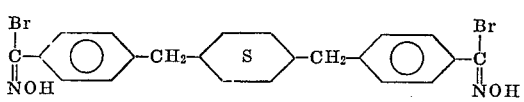

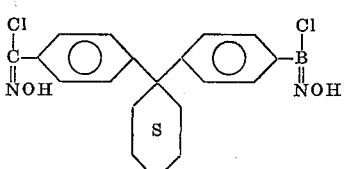

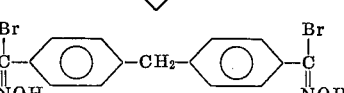

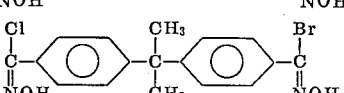

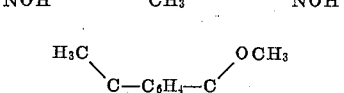

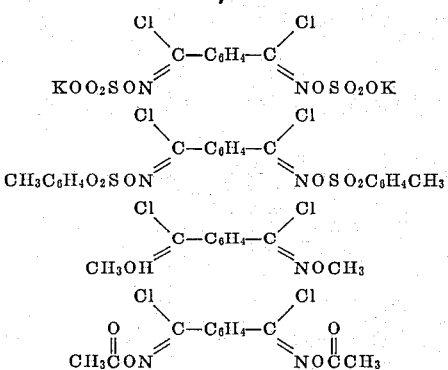

Generally, equimolar quantities of the reactants are used to form the polymers of this invention. However, it is possible to terminate the polymer chains with either hydroxamoyl halide groups or hydroxy groups merely by utilizing in the reaction an excess of the reactant containing either of those groups. To obtain relatively high intrinsic viscosity polymers, it is generally preferred that the excess not exceed about 5 mole percent.

When the polymer is terminated by hydroxamoyl halide groups, they may be reacted with compounds or polymers containing at least one group, preferably two groups, which is (are) reactive therewith under the conditions of the reaction. Such groups may be, for example, amines or phenoxides.

When an excess of the diol is used, the excess may function as chain-stoppers, or end-blocking units, the terminal hydroxy groups of which may serve as reactive groups through which the chain may be further extended by reaction with other compounds containing at least one group, preferably two groups, which is (are) reactive with they hydroxy groups under the reaction conditions. Such groups and compounds are, for example, hydroxamoyl halide; isocyanate; halogen, e.g., chlorine and bromine; epoxide; acid chlorides, e.g., adipoyl chloride, carboxy, e.g., adipic acid, tetracarboxy-naphthalene; $SO_2CL_2$; phosgene (to form a carbonate linkage); or phosgenated diols (aliphatic or aromatic bis-chloro-carbonates [to form carbonate linkages]).

Of course, it will be obvious to one skilled in the art that mixed polymers may be produced by polymerizing more than one of either or each of the two reactants. These mixed polymers may be either random or alternating and may be formed from using mixtures of different species of either of both reactants, or they may be block polymers, which may be formed by reacting an hydroxy-terminated polymer of relatively low molecular weight with a hydroxamoyl halide-terminated polymer of relatively low molecular weight which has itself been formed from a diol or hydroxamoyl halide which is different from that used to form the first polymer. The relatively low molecular weight polymers may instead be substantially the same except for one being hydroxy-terminated and the other hydroxamoyl halide-terminated, and possibly differences in molecular weight and configuration.

Cyclization of the polyesteroxime polymers may be accomplished before or after linking in the manner just described. If cyclization is to be performed before linking, the terminal hydroxy groups may need protection before cyclization is conducted. Protection may be accomplished by acetylation. After cyclization the protected groups are reconverted to hydroxy groups by hydrolysis before linking.

Although the two reactants could be directly contacted together, especially when one or both are liquids or when the reaction temperature is high enough to melt one or both, it is preferable to conduct the reaction in the presence of a solvent. The solvent may be inert or may function as an acid-acceptor to remove the by-product hydrogen halide formed during the reaction.

Illustrative of the inert solvents which may be used are acetonitrile; nitrated solvents, e.g., nitromethane and nitrobenzene; chlorinated solvents, e.g., methylene chloride, chloroform, carbon tetrachloride, ethylene chloride, and chlorobenzene; $N_2O_4$; the ethers, e.g., tetrahydrofurane, diethyl ether, and dioxane; the esters, e.g., amyl acetate, the lactones, e.g., butyrolactone, ketones, e.g., cyclopentanone and cyclohexanone; acetic acid; polyphosphoric acids; and cresols. Cyclohexanone and polyphosphoric acid are preferred.

If an inert solvent has been used, it is desirable to add to the mixture an acid-acceptor such as tertiary amine, e.g., trialkylamines such as trimethylamine, triethylamine, and the like; triethylene diamine; 1,3 dimethylamino butane; heterocyclic amines such as pyridine, picolines, lutidines; or an alkali metal or alkaline earth metal hydroxide, bicarbonate, carbonate, or alkanoate (up to four carbon atoms), e.g., sodium hydroxide, sodium carbonate, sodium bicarbonate, potassium acetate, etc.

Particularly useful acid-acceptors are those insoluble in the reaction mixture, e.g., melamine, phenylmelamine, dicyanamide, insoluble guanidine derivatives, insoluble basic ion-exchange resins. Preferred are melamine and benzoguanamine. Of course, mixtures of the acid-acceptors may be used. The aforementioned acid-acceptors may be used used in conjunction with the following solvents which also function as acid-acceptors.

Illustrative of the solvents which also function as acid-acceptors are dimethylacetamide (DMAc), dimethylformamide (DMF), pyrrolidone, and its alkylated derivatives, e.g., N-methyl-pyrrolidone, dimethyl sulfoxide (DMSO), hexamethylphosphoramide, dialkylanilines, e.g., dimethylaniline and diethylaniline, and the like. DMAc is preferred.

In place of a single solvent in the reaction mixture there may be used mixed solvent systems containing either or both types of solvents.

In order to minimize undesirable side reactions, it is preferable to use either an acid-acceptor which is insoluble in the reaction mixture, preferable melamine, or to use a soluble amine, but ensure that its instantaneous concentration in the reaction mixture is relatively low, e.g., lower than 0.01 molar concentration — for example, by slowly and continuously adding the acid-acceptor or by incrementally adding small portions. Other ways of inhibiting undesirable side reactions are indicated in the schemata which follow.

The reaction of bis(hydroxamoyl halide)or a derivative with the aromatic diol in the presence of an acid-acceptor is generally exothermic and may be conducted at autogenous temperature, or it may be conducted at a constant temperature by the application of the required cooling or heating conditions. The reaction may be conducted at temperatures of from about 0° to about 250°C., preferably about 0° to about 100°C.

The closing of the ring to actually form the PBO type polymers may be accomplished by the appropriate thermal conditions, e.g., by heating the esteroxime polymer to a temperature in the range of about 0°C. to 250°C., preferably in the presence of a catalyst, especially an acidic catalyst such as silica gel, silica-alumina, sulfonated polystrene ion-exchange resins, and polyphosphoric acid. Polyphosphoric acid is the preferred catalyst.

Ring closure may also be accomplished by the reaction of the esteroxime polymer with sulfonyl halide, such as benzene sulfonyl chloride, naphthalene sulfonyl chloride, toluene sulfonyl chloride, methane sulfonyl chloride or other ring closing reagents under appropriate conditions, e.g., about 0°C. to about 90°C. or higher, preferably about 5°C. The aromatic sulfonyl halides are preferred. Toluene sulfonyl chloride is most preferred.

The aromatic diols are either readily available or easily prepared by methods which are well-know to those skilled in the art. For example, 4,4'-dihydroxydiphenyl may be prepared by hydrolysis of 4,4'-dihalodiphenyls.

The bis (hydroxamoyl halide), the other reactant in the novel process of this invention, may be prepared by several routes. For example, the appropriate aliphatic or aromatic dialdehyde, such as terephthalaldehyde or isophthalaldehyde may be reacted with hydroxylamine to form the corresponding bisoxime, which in turn may be reacted with halogen to form the bis (hydroxamoyl halide). Another method of preparing the bis (hydroxamoyl halides) is to start with the appropriate dialkyl aromatic precursor, e.g., any of the isomers of xylene, which may be reacted with nitorsyl halide, preferably in the presence of additional halogen, to form the bis (hydroxamoyl halides). Other reagents which may be used in place of the nitrosyl halide *per se* are a combination of nitric acid and hydrohalic acid, or a combination of nitric oxide (NO) and halogen.

This second illustrative method, i.e., the reaction of an appropriate dialkyl aromatic precursor, e.g., m-xylene, with nitrosyl halide or any one of its aforementioned alternatives, is the preferred methods for the preparation of the bis (hydroxamoyl halides). This step in combination with the basic process of the invention, i.e., the reaction of the bis (hydroxamoyl halide) with an aromatic diol results in a relatively simple, easy, relatively inexpensive, over-all process for the preparation of polyesteroximes from readily available starting materials. These polyesteroximes may be converted to PBO type polymers by ring closure reaction.

The preferred process for the preparation of bis (hydroxamoyl halides) may be conducted at temperatures of from about −10°C. or lower to about 50°C. or higher. The reaction may be conducted at pressures in the range of an atomsphere or more, e.g., up to about 10 atmospheres, preferably from about one to about 5 atmospheres. In view of the corrosive nature of some of the reactants and products, such as nitrosyl halide, it is preferred to conduct the reaction in a reactor fabricated from a material which is inert under the reaction conditions, for example, a glass-lined reactor or one fabricated from titanium or nickel.

To enable the reader to more easily visualize the steps of the invention, the following schemata are set forth, using illustrative reactants. It will be readily apparent to the reader, however, that other reactants mentioned throughout the specification and claims may be used in their stead.

PREPARATION OF ESTEROXIME POLYMER FROM BIS(HYDROXAMOYL CHLORIDE)

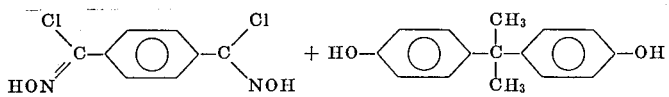

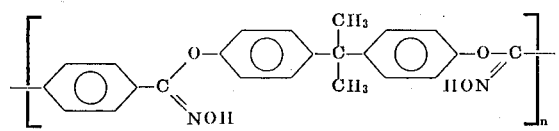

PREPARATION OF POLYBENZOXAZOLE FROM ESTEROXIME POLYMER

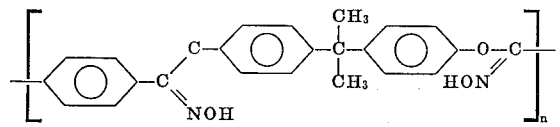

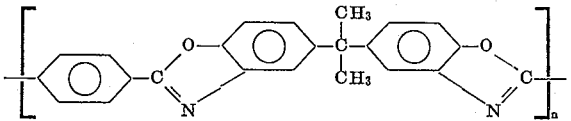

PREPARATION OF BIS(HYDROXAMOYL CHLORIDE FROM XYLENE

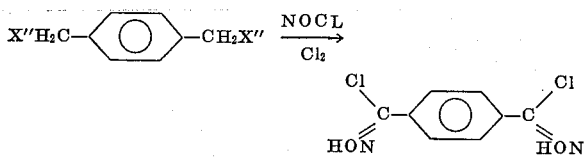

X'' may be hydrogen or chlorine

Instead of p-xylene used in the above illustration, one may instead use another aromatic reactant corresponding to the desired aromatic bis(hydroxamoyl halides) described above.

It is possible that a bis(hydroxamoyl halide) may decompose in the presence of certain acid-acceptors in accordance with the following illustrative side reaction:

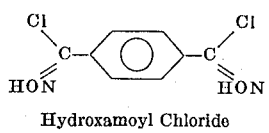

Hydroxamoyl Chloride

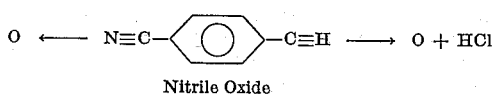

Nitrile Oxide

In order to inhibit or eliminate this side reaction other alternative reactants may be used in place of the bis (hydroxamoyl halide) in the reaction to form esteroxime polymers, e.g., the O-sulfonate derivatives, which may be formed in accordance with the following illustrative schemes.

PREPARATION OF O-SULFONATES OF BIS(HYDROXAMOYL CHLORIDES)

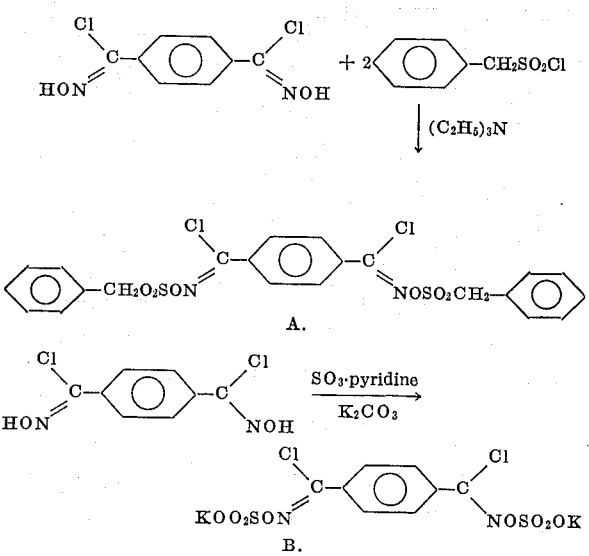

The product in A or B can be reacted with aromatic diols to give esteroxime —O— sulfonate polymers which can then be converted to polybenzoxazole (PBO)type polymers in manners analogous to those illustrated above wherein bis(hydroxamoyl halides) have been exemplified as the starting materials.

EXAMPLE 1

To a solution of 23.3 grams (0.1 mol.) of a bis (hydroxamoyl chlorine) of the formula

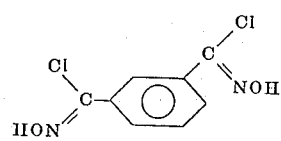

in 300 mls. of dry cyclohexanone, are added with stirring at room temperature a suspension of 28.0 grams (0.1 mol.) of the dry potassium salt of p,p'-dihydroxy diphenyl ether in 200 mls. of cyclohexanone. The addition requires about 30 minutes, after which the reaction mixture is stirred for another 2 hours. the esteroxime polymer is precipitated and washed with hot water to remove KCl.

The polyesteroxime is dissolved in 300 mls. of pyridine. To this solution are added 41.9 grams (0.22 mols.) of toluene sulfonyl chloride at a temperature of 5°C. After standing overnight at 5°C, the polybenzoxazole is precipitated, washed and dried.

EXAMPLE 2

POLYBENZOXAZOLES FROM BIS(HYDROXAMOYL CHLORIDES)

To a solution of 22.9 grams (0.1 mole) of bisphenol A in 300 ml. of dimethylactemide (DMAc), maintained at 95°C, are added with stirring 23.3 grams (0.1 mole) of bis(hydroxamoyl chloride) of the formula:

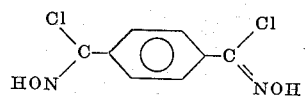

The addition is completed in about 20 minutes and stirring is continued for another hour at 95°C.

To effect ring closure of the esteroxime polymer to form the polybenzoxazole, the reaction mixture is cooled to about 5°C. and 38.1 grams (0.2 mole) of toluene sulfonyl chloride and 100 mls. of pyridine are added. The reaction mixture is allowed to stand overnight at 5°C., after which water is added and the polymer is filtered, washed with water and methanol, and dried. The washings and filtrate are evaporated for recovery of DMAc and toluene sulfonic acid. (The latter is reconverted to the sulfonyl chloride for reuse by reaction with chlorosulfonic acid.)

EXAMPLE 3

A solution of 16.2 grams (0.05 mol.) of oxydiphenylene-p,p'-bis(carbohydroxamoyl chloride), viz.:

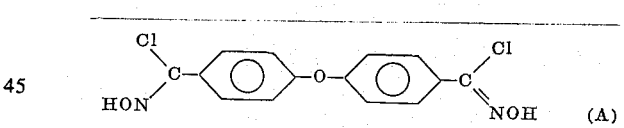 (A)

in 200 mls. of dry butyrolactone is prepared. To this solution is added with stirring a suspension of the dry sodium derivative of p,p'-dihydroxy diphenyl ether (12.3 grams, 0.05 mol.) in 200 mls. of dry butyrolactone. After the addition is complete (20 minutes), the reaction mixture is warmed to 50°–60°C and stirred at this temperature for another hour. The polyesteroxime is precipitated by addition of water, and is washed and dried.

The polyesteroxime is dissolved in a mixture of 500 mls. DMAc and 300 mls. pyridine. Toluene sulfonyl chloride (19 grams, 0.1 mol.) is added as ring closure reagent, and the mixture is stirred and allowed to stand overnight at 5°C. Water is added and the polybenzoxazole is washed and dried.

The above polyesteroxime also can be prepared by reacting the sodium derivative of p,p'-dihydroxy diphenyl ether with the toluene sulfonate of the bis(hydroxamoyl chloride), viz.

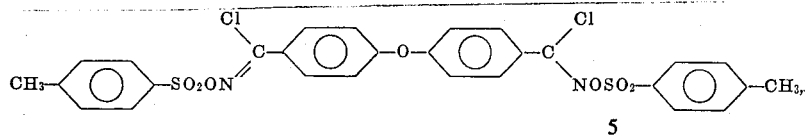

which is made by adding toluene sulfonyl chloride to (A) in the presence of triethylamine.

EXAMPLE 4

To a stirred solution of 10.1 grams (0.05 mol) of p,p'-dihydroxy diphenyl ether and 10.1 grams (0.1 mol) tri-ethylamine in 400 ml. tetrahydrofurane, are added 16.2 grams (0.05 mols) of oxydiphenylene-p,p'-bis(carbohydroxamoyl chloride) of the following structure:

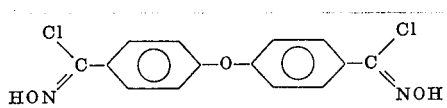

(The latter compound may be prepared by the reaction of NOCl and $Cl_2$ on p,p'-dimethyl diphenyl ether.) The reaction mixture is stirred at 40°–50°C. for 2–3 hours, after which the mixture is filtered and the esteroxime polymer is washed with water, alcohol and ether.

The polyesteroxime is dissolved in 1,000 ml. of DMAc and the solution is cooled to 10°C. Toluene sulfonyl chloride (19 grams, 0.1 mol) is added as ring closure reagent, and the mixture is stirred and allowed to stand overnight at 10°C. Water is added, and the polybenzoxazole is washed and dried.

EXAMPLE 5

A solution of 20.0 grams (0.01 mol) of p,p'-dihydroxy diphenyl methane in 400 ml. of N-methyl pyrrolidone is prepared. To this solution 23.2 grams (0.1 mol) of isophthalhydroxamoyl chloride are added with stirring. After about 3 hours of stirring at 60°C., the mixture is cooled to 5°C. and 38.1 grams (0.2 mol) of toluene sulfonyl chloride are added. The mixture is stirred at 5°–10°C. for 12 hours. The polybenzoxazole is filtered, washed and dried.

EXAMPLE 6

5.5 grams (0.05 mol) of m-dihydroxybenzene (resorcinol) are dissolved in 200 ml. of DMAc. A solution in 200 ml. of DMAc of 15.4 grams (0.05 mol) of diphenylene bis(carbohydroxamoyl chloride) is added with stirring. This bis(hydroxamoyl chloride) can be prepared by the action of NOCl and $Cl_2$ on a mixture of dimethyl diphenyls, as obtained in the oxidative coupling of toluene over Pd++, and has the following general structure:

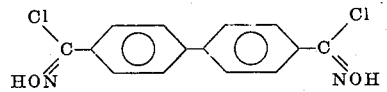

The reaction mixture is stirred at 60°–70°C. for about 3 hours. The mixture is then cooled to 5°–10°C., and 19 grams (0.1 mol) of toluene sulfonyl chloride are added.

After standing overnight at 10°C., the polybenzoxazole is filtered off, washed and dried.

EXAMPLE 7

PREPARATION OF TEREPHTHALBIS(HYDROXAMOYL CHLORIDE)

A mixture of nitrosyl chloride and chlorine is generated from conc. nitirc and hydrochloric acids:

$$HNO_3 + 3HCl = NOCl + Cl_2 + 2H_2O$$

The NOCl and $Cl_2$ are passed in gaseous form into a separate glass vessel containing a mixture of p-xylene and sufficinet amounts of carbon tetrachloride, to maintain solubility of reactive intermediates maintained at 15°C. An ultraviolet lamp irradiates the reaction mixture for 2–3 hours. The mixture is filtered to remove the crude terephthalbis(hydroxamoyl chloride), which is then recrystallized severaly times from chloroform to yield colorless leaflets melting with decomposition at 188°C. The procedure is repeated on the original xylene-CC14 mother liquor with make-up for reacted xylene. Also, by-products from the chloroform mother liquor, such as terephthaldialdoxime, xylylene dichloride, methyl benzaldoxime and methyl benzhydroxamoyl chloride, etc., may be recycled for retreatment.

EXAMPLE 8

Diphenylene-p,p'-(carbohydroxamoyl chloride) is prepared by reaction of NOCl and $Cl_2$ on p,p'-dimethyl diphenyl. The bis (hydroxamoyl chloride) has the following structure:

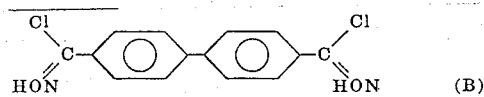

15.4 grams (0.05 mol) of this bis(hydroxamoyl chloride) are dissolved in 200 mls. of cyclopentanone. To this solution is added, with stirring, a solution of 9.3 grams (0.05 mol) of dry potassium resorcinolate (m-dihydroxy benzene) in 200 mls. of cyclopentanone. The addition is complete in one-half hour. The mixture is stirred for 2 hours at 60°C.

The reaction mixture is cooled to 0°C, and 50 mls. pyridine and 19.0 grams (0.1 mol) toluenesulfonyl chloride are added with stirring. After standing overnight at 5°C, the polybenzoxazole is filtered, washed with water and methanol and dried.

An alternative method is to react (B) with toluenesulfonyl chloride in the presence of an equivalent amount of triethylamine, to form the O-sulfonate prior to reaction with the potassium resorcinolate.

EXPERIMENT 1

PREPARATION OF TEREPHTHAL - BIS (N-ACETYLATED HYDROXAMOYL CHLORIDE)

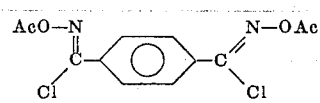

A weight of 4.66 grams (0.02 mole) of terephthal -bis (hydroxamoyl chloride) was dispersed in a mixture of 25 mls. of acetic acid and 25 mls. of acetic anhydride. Two drops of conc. H₂SO₄ were added. The compound slowly dissolved, and a slight exotherm occurred as acetylation took place. There resulted a clear solution at about 35°–40°C.

When the solution was cooled, crystals readily came out. These were collected and washed with petroleum ether. There were obtained 5.7 grams of product, or 90 percent yield of the acetylated derivative.

The acetylated derivative melted at 152°C. The elemental analyses were as follows:

|  | %C | %H | %N | %O | %Cl |
|---|---|---|---|---|---|
| Calcd. for C₁₂H₁₀N₂O₄Cl₂: | 41.0 | 3.44 | 9.56 | 21.8 | 24.2 |
| Found: | 45.3 | 3.09 | 8.69 | 20.3 | 23.5 |

What is claimed is:

1. A process for the preparation of esteroxime polymers which comprises reaction:

A. an alkali metal di-salt of an aromatic dihydroxy compund having the formula:

M'O—Y—OM' wherein M' is lithium, sodium, or potassium, and Y is —C₆H₄, —C₁₀H₆—, —C₁₄H₈—, —C₆H₄—C₆H₄— or —C₆H₄—R—C₆H₄ —, wherein R is

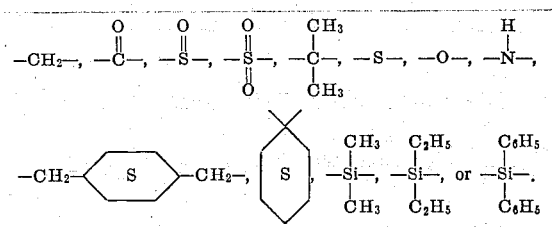

with

B. a bis(hydroxamoyl halide) having the following formula:

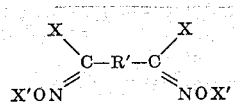

wherein X is halogen, —OC₆H₅, —OR" or —SR" (R" being alkyl containing up to four carbon atoms); R' is a direct bond or a divalent aliphatic radical, a divalent aromatic radical or an organosilicon group selected from the group consisting of

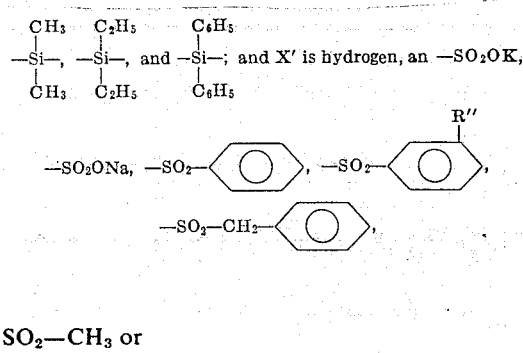

—SO₂—CH₃ or

group, at a temperature of from about 0° to about 250° C. for a period of time sufficient to form the polymer.

2. The process of claim 1 wherein the bis(hydroxamoyl halide) has the formula:

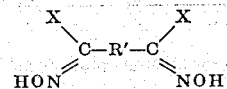

wherein X is halogen and R' is a divalent aliphatic radical, a divalent aromatic radical or an organosilicon group, selected from the group consisting of

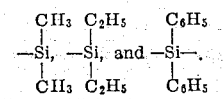

3. The process of claim 2 wherein X is bromine or chlorine and R' is a divalent aliphatic or aromatic group.

4. The process of claim 3 wherein R' is a divalent aliphatic group containing up to about four carbon atoms or a divalent aromatic group containing up to about 18 carbon atoms.

5. The process of claim 1 wherein the aromatic dihydroxy compound or its alkali metal di-salt contains up to about 30 carbon atoms.

6. The process of claim 1 wherein the aromatic dihydroxy compound or its salt contains up to about 20 carbon atoms.

7. The process of claim 6 wherein there is used a dilithium, disodium or dipotassium salt of the aromatic dihydroxy compound.

8. The process of claim 1 wherein an acid-acceptor is present during the reaction.

9. The process of claim 8 wherein the acid-acceptor is melamine, dicyanamide, or Benzoguanamine.

10. The process of claim 1 wherein there is present during the reaction a solvent selected from the group consisting of acetonitrile, nitromethane, nitrobenzene, methylene chloride, chloroform, carbon tetrachloride, ethylene chloride, chlorobenzene, N₂O₄, tetrahydorfurane, diethyl ether, dioxane, amyl acetate, butyrolactone, cyclopentaneone, cyclohexanone, acetic acid, polyphosphoric acid and cresols.

11. The process of claim 10 wherein the solvent is cyclohexanone.

12. The process of claim 1 wherein there is present during the reaction a solvent which also functions as an acid-acceptor, selected from the group consisting of dimethylacetamide, dimethylformamide, pyrrolidone, N-methylpyrrolidone, dimethyl formamide, dimethyl sulfoxide, hexamethylphosphoramide, and N,N-dimethylaniline.

13. The process of claim 1 wherein the reaction is conducted at a temperature of from about 0° C. to about 100° C.

14. The process of claim 1 wherein the bis(hydroxamoyl halide) is prepared by reacting a dialkyl aromatic compound with nitrosyl halide for a period of time sufficient to form the product.

15. The process of claim 14 wherein the nitrosyl halide is nitrosyl chloride or nitrosyl bromide.

16. The process of claim 14 wherein the temperature of the reaction is from about −10°C. to about 50°C.

17. The process of claim 1 wherein the bis(hydroxamoyl halide) is prepared by reacting an aliphatic or aromatic dialdehyde with hydroxylamine to form the corresponding bisoxime, which is then reacted with halogen to form the bis(hydroxamoyl halide), each reaction step being conducted at a temperature of from 0° to 100° C.

18. A film and fiber forming polyesteroxime polymer consisting essentially of repeatings units of the formula:

$$\left[ -R'-C\underset{NOH}{\overset{O-Y-O}{<}}\underset{HON}{>}C- \right]$$

wherein R' is a direct bond or divalent aliphatic radical, a divalent aromatic radical or an organosilicon group selected from

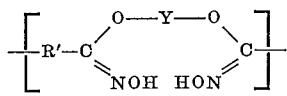

and Y is $-C_6H_4-$, $-C_{10}H_6-$, $-C_{14}H_8-$, $-C_6H_4-C_6H_4-$, $-C_6H_4-R-C_6H_4-$, wherein R is

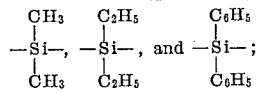

19. The polyesteroxime polymer of claim 18 wherein R' is a divalent aliphatic radical containing up to about four carbon atoms.

20. The polyesteroxime polymer of claim 18 wherein R' is a divalent aromatic radical containing up to about 18 carbon atoms.

21. The process of claim 1 wherein the esteroxime polymers are contacted with a sulfonyl halide selected from the group consisting of benzene sulfonyl chloride, toluene sulfonyl chloride, naphthalene sulfonyl chloride, or methane sulfonyl chloride at a temperature of about 0° C. to about 90° C. for a period of time sufficient to convert at least some of the esteroxime groups to benzoxazole groups.

* * * * *